Sept. 8, 1959                H. W. TRECHSEL                 2,902,889
                          HYDRAULIC TURRET INDEX
Filed June 18, 1956                                    3 Sheets-Sheet 1

INVENTOR.
Hans Werner Trechsel
BY
ATTORNEYS.

Sept. 8, 1959  H. W. TRECHSEL  2,902,889
HYDRAULIC TURRET INDEX
Filed June 18, 1956

INVENTOR.
Hans Werner Trechsel
BY
ATTORNEYS.

Sept. 8, 1959  H. W. TRECHSEL  2,902,889
HYDRAULIC TURRET INDEX
Filed June 18, 1956  3 Sheets-Sheet 3
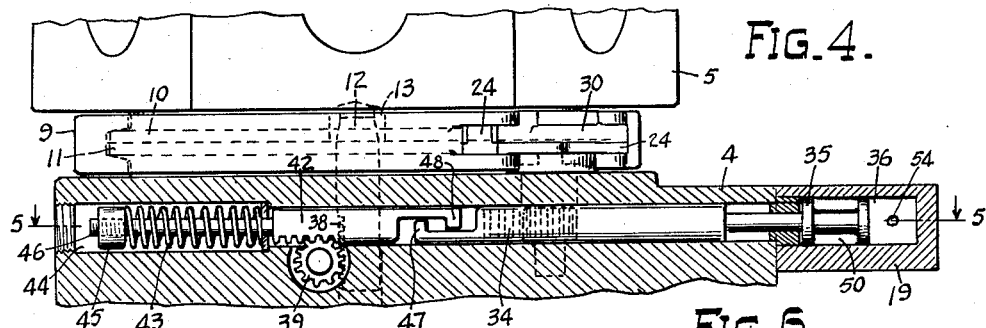
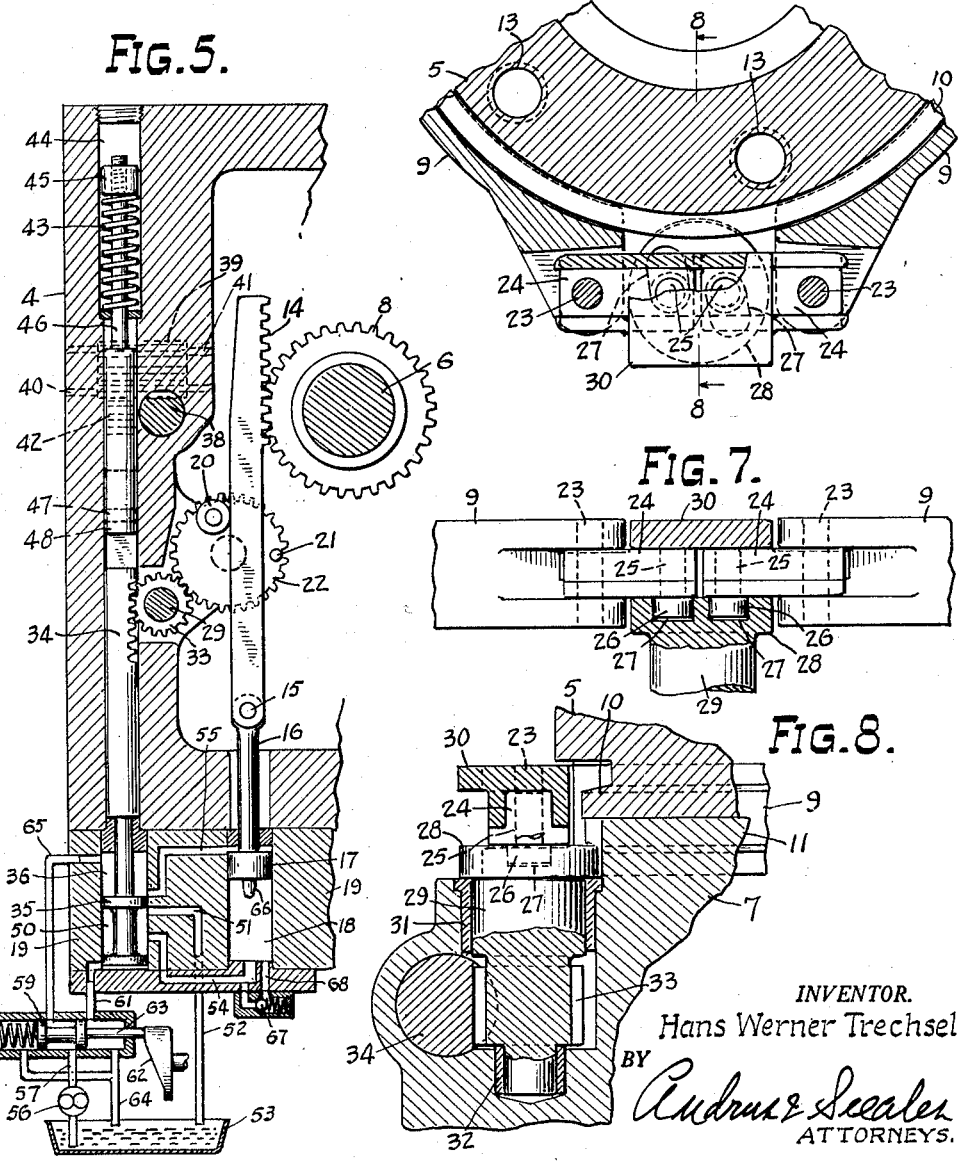
INVENTOR.
Hans Werner Trechsel
ATTORNEYS.

United States Patent Office 2,902,889
Patented Sept. 8, 1959

2,902,889

HYDRAULIC TURRET INDEX

Hans Werner Trechsel, Madison, Wis., assignor to Gisholt Machine Company, Madison, Wis., a corporation of Wisconsin Application June 18, 1956, Serial No. 592,110

6 Claims. (Cl. 74—823)

This invention relates to a hydraulic turret index for machine tools.

Heretofore turret lathes have generally employed positive mechanical actuating mechanism for unclamping, unlocking, indexing, clamping and locking the turret. Such mechanical mechanisms have encountered problems of acceleration and deceleration of masses and also of interference in time sequences.

The present invention employs a novel hydraulic means for effecting the unclamping, unlocking, indexing, locking and clamping of the turret, whereby acceleration and deceleration are properly cushioned and time sequence overlap is more tolerable. The indexing of the turret is effected by a rack which is laterally movable into engagement with a gear associated with the turret to rotate the latter upon longitudinal movement of the rack.

The clamping, locking and lateral movement of the rack are effected by one piston with suitable lost motion so that the relocking of the turret by a pin and spring means occurs before the reclamping. The longitudinal movement of the rack is effected by a second piston which is operable in each direction only after the first piston has completed its functions.

In carrying out the invention the movements necessary are effected by two separate pistons or reversible hydraulic motors actuated in correlation from a single fluid pressure source either by manual or automatic means. The construction is particularly suitable for automatic lathes since it provides a simple means for utilizing automatic valve shift actuation.

The accompanying drawings illustrate the best mode presently contemplated of carrying out the invention.

In the drawings:

Fig. 4 is a sectional view taken on line 4—4 of Fig. 2 and through the turret locking pin;

Fig. 5 is a sectional view taken on line 5—5 of Fig. 4 to show the rack and pinion for indexing of the turret and includes the hydraulic system shown diagrammatically;

Fig. 6 is an enlarged detail showing of the ends of the clamp and its actuator and with part of the turret broken away and sectioned;

Fig. 7 is a side elevation of the end of the clamp shown in Fig. 6 with parts of its actuator broken away and sectioned;

Fig. 8 is a sectional view taken on line 8—8 of Fig. 6 showing the clamp actuator drive means.

Figure 9:
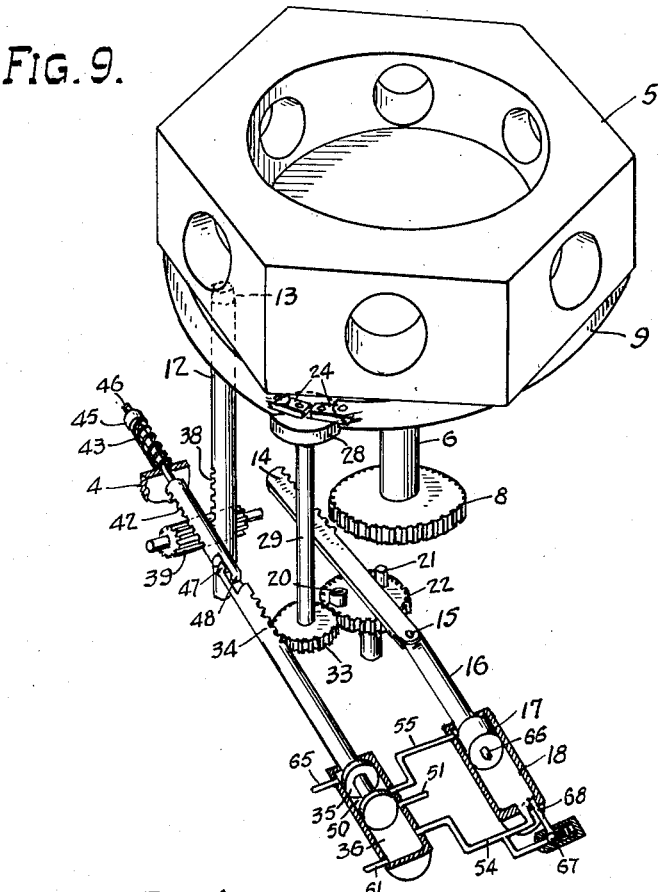
Fig. 9 is a schematic layout in three dimensions showing the hydraulic circuit and mechanism for effecting the locking, clamping and indexing of the turret.
Figure 1:
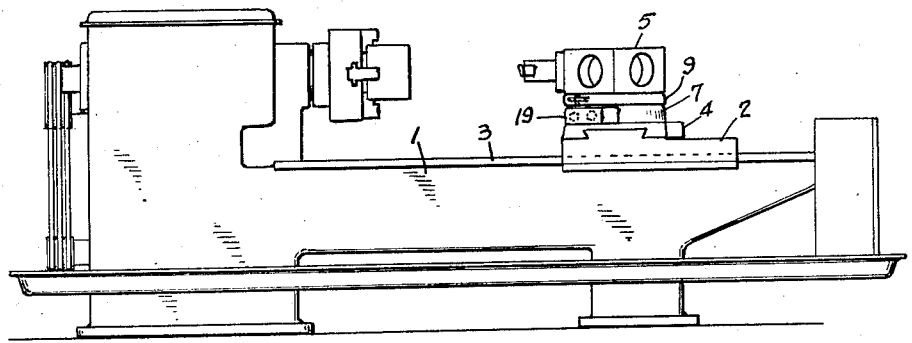
Figure 1 is a front elevation of a lathe shown in reduced scale and having a turret and slide on an adjustable carriage.

In the construction illustrated, the lathe has a bed 1, an adjustable carriage 2 mounted on longitudinal ways 3 thereon, a slide 4 carried by the carriage and movable thereon, and a turret 5 mounted on the slide 4.

The turret 5 has a depending vertical spindle 6 which is rotatably supported by suitable bearings in a vertical opening in the base 7. Base 7 is an elevated portion of slide 4 providing the direct support of turret 5. The lower end of spindle 6 carries a gear 8 within slide 4 and fixed to the spindle for rotating the turret 5.

The turret 5 is clamped in index position by the usual clamp ring 9 circumferentially embracing the adjacent clamp flanges 10 and 11 of the turret 5 and the base 7, respectively.

The turret 5 is locked in index position by the usual lock pin 12 which is vertically movable to enter a recess in one of the lock bushings 13 in the lower surface of the turret bottom, there being a separate lock bushing 13 for each index position of the turret.

Referring to the indexing drive, the rack 14 is pivotally connected at one end by the pin 15 to the corresponding end of rod 16. The other end of rod 16 is connected to the piston 17 which is reciprocable within the cylinder 18 formed in the block 19 affixed to one side of slide 4. The free end of rack 14 is adapted to swing into engagement with gear 8 whereupon movement of piston 17 in one direction is effective to rotate the turret to the next indexed position.

Figure 2:
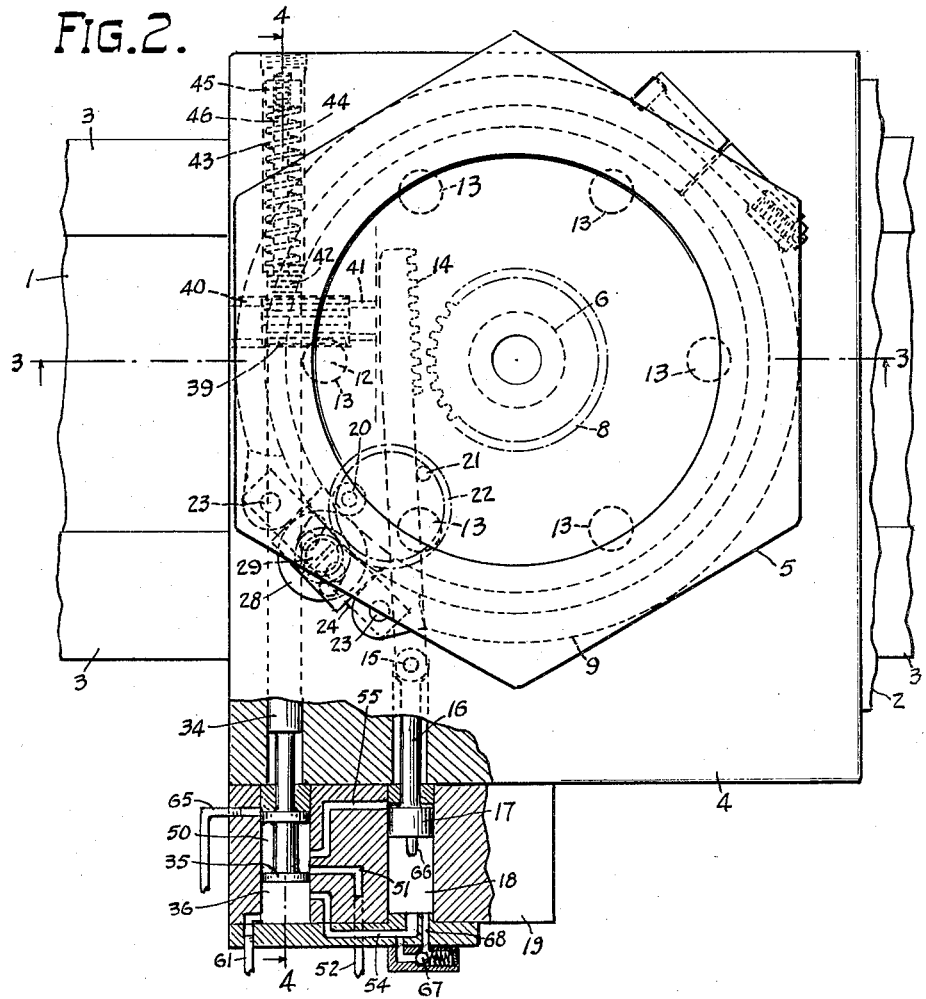
Fig. 2 is an enlarged top plan view of the turret and slide and with parts broken away and sectioned and with other parts of the turret indexing mechanism shown in dotted lines.
Figure 3:
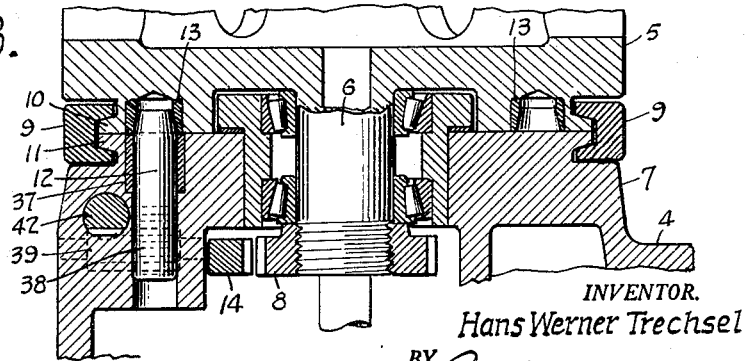
Fig. 3 is a sectional view taken on line 3—3 of Fig. 2 and through the turret locking pin.

The pin 20 carried by the gear 22 on one side of rack 14 is disposed to push the rack into operative engagement with gear 8 upon a given rotation of gear 22. Upon movement of piston 17 and indexing of turret 5, the pin 21 carried by gear 22 on the other side of rack 14 is moved to disengage the rack from gear 8 allowing the return movement of piston 17 in the opposite direction and to the position shown in Fig. 2.

Referring to the actuation of the clamp ring 9, the adjacent ends of the ring are pivotally connected by pins 23 to the outer ends of corresponding links 24. The inner adjacent ends of links 24 have corresponding depending vertical pins 25 having lower head 26 disposed in the corresponding slots 27 of the rotary cam wheel 28.

Rotation of wheel 28 in one direction for a given part of a revolution moves the slots 27 to effect separation of pins 25 thereby separating the ends of clamp ring 9 and loosening the ring. Rotation of wheel 28 in the opposite direction moves the slots 27 to move the pins 25 toward each other thereby actuating the links 24 to pull the ends of the clamp ring 9 together and effect tightening the clamp ring upon flanges 10 and 11. The guide member 30 secures links 24 in parallel relation so that rotation of wheel 28 is effective to tighten clamp ring 9.

Wheel 28 is formed by the upper end of the vertical shaft 29 which is carried in base 7 by the upper and lower bushings 31 and 32. The gear 33 which is an integral part of shaft 29 meshes with the rack 34 connected at one end to the piston 35. Piston 35 is operable in the hydraulic cylinder 36 of block 19 so that movement of piston 35 in one direction effects tightening of clamp ring 9 and clamping of the turret in index position and movement of piston 35 in the opposite direction effects loosening of clamp ring 9 and unclamping of the turret.

Referring to the actuation of lock pin 12, the pin is vertically disposed in a bearing sleeve 37 in the base 7. The lower portion of the pin 12 has a series of teeth to form the rack 38 which meshes with the double pinion 39 rotatably supported by slide 4 in the bushings 40 and 41. The rack 42 which also meshes with double pinion 39 is biased in one direction by the spring 43 to urge the locking pin 12 into locking position at all times. Spring 43 is disposed in the bore 44 formed in slide 4 and between the inner end of the bore and the collar 45 threaded on the rod 46 extending within the spring and connected to rack 42.

In order to withdraw the locking pin 12 from a bushing 13 the pin is hydraulically moved downward against the action of spring 43. For this purpose racks 34 and 42 are provided with the interengaging fingers 47 and 48, respectively, as shown in Fig. 4, whereby the actuation of piston 35 moving racks 34 and 42 effects the rotation of pinion 39 and the withdrawal of pin 12. Fingers 47 and 48 comprise a lost motion device which allows piston 35 considerable movement before their engagement. Such engagement occurs with some force and the impact or hammer effect serves to loosen pin 12 from the particular bushing.

According to the invention, gears 22 and 33 are driven by rack 34 and cylinders 18 and 36 are interconnected to provide the actuation of pin 12, clamping ring 9 and indexing of turret 5 in the desired sequence and with only a minimum amount of delay to allow, for example, the relocking of the turret by pin 12 before the turret is secured to its base by the clamp ring 9. For this purpose, piston 35 has a center portion of reduced diameter to provide the annular chamber 50. The discharge passage 51 is formed in block 19 to open into the chamber 50 and communicates with line 52 extending to the sump 53. The passages 54 and 55 from corresponding opposite ends of cylinder 18 open into cylinder 36 adjacent to passage 51 and are located so that chamber 50 while in communication with passage 51 is alternatively in communication with one or the other of passages 54 and 55 depending upon the position of piston 35.

Referring to Fig. 5, piston 35 is moved by fluid pressure as supplied from sump 53 by the pump 56 through the line 57 connected to the valve body 58. The valve spool 59 within valve body 58 is normally held in one position by the spring 60 to provide communication of line 57 with the conduit 61. Conduit 61 is connected to the end of cylinder 36 remote from slide 4 so that piston 35 is normally held in the position shown in Fig. 2 and with passage 54 uncovered whereby the fluid pressure supplied to cylinder 38 normally holds piston 17 in the position also shown in Fig. 2 for indexing turret 5.

The indexing cycle is begun by movement of valve spool 59 to the position shown in Fig. 5. Various means may be provided to move valve spool 59 when the turret slide 4 is retracted to a given position, as for example, the cam 62 which is disposed for movement relative to the pin 63 of valve spool 59. Such movement of spool 59 places the return line 64 in communication with conduit 61 and the fluid supply line 57 in communication with the conduit 65 having connection with the end of cylinder 36 opposite that of conduit 61.

Piston 35 is moved by fluid pressure supplied through conduit 65 and pulls rack 34 to rotate gears 22 and 33. The rotation of cam wheel 28 with gear 33 effects the release of clamp ring 9 and the movement of pin 20 carried by gear 22 pushes rack 14 in engagement with gear 8. With further movement of rack 34, the finger 47 of rack 34 engages finger 48 of rack 42 to move the latter which compresses spring 43 and effects rotation of double pinion 39. Such rotation of pinion 39 moves locking pin 12 downwardly to release turret 5.

As piston 35 approaches the end of its stroke the chamber 50 places passages 51 and 54 in communication and uncovers passage 55 so that fluid under pressure from conduit 65 is also supplied to cylinder 18. The movement of piston 17 effected by such pressure then pulls rack 14 to rotate gear 8 and turret 5 to the next position. As piston 17 moves to rotate turret 5 the fluid in cylinder 18 ahead of the piston is discharged through passage 54, chamber 50 and passage 51 to line 52 and sump 53. Passage 54 opens centrally into the end of cylinder 18 to receive the plunger 66 carried by piston 17 as the latter approaches the end of its stroke. Plunger 66 gradually closes passage 54 so that the pressure developed in cylinder 18 decelerates the piston and gradually stops the rotation of turret 5 at its next indexed position.

The relocking and reclamping of turret 5 and return movement of rack 14 may be variously initiated as by movement of cam 62 relative to pin 63 which allows spring 60 to return valve spool 59 to the position again placing line 57 in communication with conduit 61 and conduit 65 in communication with return line 64. The return movement of piston 35 and rack 34 then provided by fluid pressure allows spring 43 to move rack 42 and lift pin 12 to relock turret 5. When pin 12 is well seated in the particular bushing 13 no further movement of rack 42 occurs and the disengagement of fingers 47 and 48 allows the continued movement of rack 34 effecting rotation of gear 33, cam wheel 28 and the tightening of clamp ring 9 to firmly secure turret 5 to base 7. The rotation of gear 22 causes pin 21 to push rack 14 out of engagement with gear 8 for the return movement of the rack by piston 17. Such return movement is effected by the fluid under pressure supplied to cylinder 36 as piston 35 approaches the end of its return stroke and uncovers passage 54. Passages 51 and 55 are relatively disposed so that they are in communication through chamber 50 at least for a period which allows the fluid under pressure reaching cylinder 18 through passage 54 to effect the full return of piston 17.

Passage 54 can be opened before piston 35 reaches the end of its return stroke, thus preventing full clamping of clamp ring 9 in a multiple indexing step until the final position of the turret is reached.

To provide a quick return of piston 17, a ball check valve 67 is disposed in a passage 68 which communicates with cylinder 18 and passage 54. Pressure supplied from the cylinder side of passage 68 will seat valve 67 and prevent fluid from passing through passage 68 to provide for deceleration of piston 17. On the return stroke, pressure supplied through passage 54 will unseat valve 67 to allow pressure to pass through passage 68 and provide a quick initial upward movement of piston 17.

The movement of cam 62 can be readily actuated in timed sequence with the lathe cycle and automatic control may be readily employed.

The movements of the several racks and the rotation of gears 22 and 33 are readily predetermined and the indexing of the turret may be effected in a minimum part of the automatic cycle.

Various modes of carrying out the invention are contemplated as within the scope of the following claims particularly pointing out and distinctly claiming the subject matter which is regarded as the invention.

I claim:

1. In a machine tool including a tool turret having a gear for rotation of the turret, a base supporting said turret for such rotation, a pin carried by said base to lock the turret in each of several indexed positions of rotation, said pin being axially movable to lock and unlock the turret and having gear means to effect such movement, a clamp ring releasably securing said turret to said base in each of said indexed positions and including cam means, means for operating said cam means to effect tightening and loosening of the clamp ring; a first gear rack operatively associated with said gear means and movable in one direction to unlock the turret, a spring normally biasing said rack in the reverse direction locking the turret, a second gear rack operatively connected with said cam means and movable in the said one direction to release the turret and in the said reverse direction to resecure the turret, hydraulic means including a cylinder and a piston operable in said cylinder and connected to said second rack to move the same in either of said directions, said racks having abutment means allowing a given initial movement of the second rack in said one direction and separately of the first rack whereupon the engagement impact of the abutment means is effective to loosen the pin and the continued movement of the first rack effects compression of said spring and the withdrawal of said pin, a second cylinder and a second piston movable within and from one end toward the other end of said second cylinder, a third rack connected to said second piston and movable laterally into and out of engagement with the turret gear, a gear wheel driven by said second rack and having separate abutment means to move said third rack into engagement with the turret gear with the above movement of the second rack by the first piston, reversible fluid supply means including supply and return lines connected to opposite ends of said first cylinder and a discharge line from said first cylinder intermediate the ends thereof, said second cylinder having passages from opposite ends thereof and opening into said first cylinder adjacent to and on corresponding opposite sides of said discharge line, said first piston being dimensioned and having a recessed portion between its ends to place one of said last named passages selectively in communication with said discharge line and open the other passage to the fluid actuating the first piston, said second piston being controlled by said first piston and subject to movement in the direction indexing the turret after said first piston has unlocked and released the turret and moved the third rack into engagement with the turret gear for indexing, the reversing of said fluid supply means effecting the movement of said first piston in the direction allowing relocking of the turret by said spring and effecting the resecuring of the turret by the clamp ring and disengagement of the third rack from the turret gear, upon such movement said first piston being positioned to place said other passage in communication with said discharge line and to open said one passage to the fluid actuating the first piston whereupon the return of the second piston and third rack without rotation of the turret is effected and the indexing cycle is completed.

2. In a machine tool including a rotatable tool turret having a gear for rotation of the turret, a base supporting said turret for such rotation, a pin carried by said base to lock the turret in each of several indexed positions of rotation, and a clamp ring releasably securing said turret to said base in each of said indexed positions; a first means operatively associated with said pin and movable in one direction to unlock the turret, a spring normally biasing said means in the reverse direction locking the turret, a second means associated with said clamp ring and movable in the said one direction to release the turret and in the said reverse direction to resecure the turret, hydraulic means including a cylinder and a piston operable in said cylinder and connected to said second means to move the same in either of said directions, said means having a lost motion device allowing a given initial movement of the second means in said one direction and separately of the first means whereupon the engagement impact of the device is effective to loosen the pin and the continued movement of the first means effects compression of said spring and the withdrawal of said pin, a second cylinder and a second piston movable within and from one end toward the other end of said second cylinder, a rack connected to said second piston and movable laterally into and out of engagement with the turret gear, said second means having separate abutment means to move said rack into engagement with the turret gear with the above movement of the second means by the first piston, reversible fluid supply means including supply and return lines connected to opposite ends of said first cylinder and a discharge line from said first cylinder intermediate the ends thereof, said second cylinder having passages from opposite ends thereof and opening into said first cylinder adjacent to and on corresponding opposite sides of said discharge line, said first piston having valve means to place one of said last named passages selectively in communication with said discharge line and open the other passage to the fluid actuating the first piston, said second piston being controlled by said first piston and subject to movement in the direction indexing the turret after said first piston has unlocked and released the turret and moved the rack into engagement with the turret gear for indexing, the reversing of said fluid supply means effecting the movement of said first piston in the direction allowing relocking of the turret by said spring and effecting the resecuring of the turret by the clamp ring and disengagement of the rack from the turret gear, upon such movement said valve means being disposed to place said other passage in communication with said discharge line and to open said one passage to the fluid actuating the first piston whereupon the return of the second piston and rack without rotation of the turret is effected and the indexing cycle is completed.

3. In a machine tool including a rotatable tool turret having a gear for rotation of the turret, a base supporting said turret for such rotation, a pin carried by said base and normally biased to lock the turret in each of several indexed positions of rotation, and a clamp ring releasably securing said turret to said base in each of said indexed positions; means connected to said pin to lock and unlock the turret, hydraulic means operatively connected to said clamp ring to secure and release the turret, said means having a lost motion device allowing a given initial movement of the hydraulic means in one direction and separately of the first means whereupon the engagement impact of the device is effective to loosen the pin and the continued movement of the first means effects withdrawal of said pin, a second hydraulic means including a gear rack movable laterally into and out of engagement with the turret gear, said first hydraulic means including separate abutments to move said rack into engagement with the turret gear with the release and unlocking of the turret, reversible fluid supply means connected to said first hydraulic means, fluid supply and valve means interconnecting said hydraulic means whereby the second hydraulic means is controlled by movement of the first hydraulic means in the direction unlocking and releasing the turret and movement of the rack into engagement with the turret gear for indexing, the reversing of said fluid supply means effecting the relocking and resecuring of the turret and disengagement of the rack from the turret gear, upon such movement said valve means being disposed to effect return of the rack without rotation of the turret and completion of the indexing cycle.

4. In combination in a machine tool, a turret, clamp means adapted to secure said turret in indexed position, cam means adapted to tighten and loosen said clamp means, a hydraulic cylinder extending transversely of said aforesaid means, a piston in said cylinder, a rack and gear connection between said piston and said cam means to actuate the latter and effect clamping and unclamping of the turret, lock means engaging said turret and operatively connected to said piston, and lost motion means disposed between said piston and said lock means to provide successive operation of said cam means and lock means during operation of the piston, said lost motion means being constructed to loosen said lock means by a hammer-like impact.

5. In combination in a machine tool, a turret to be indexed, gear operated clamp means for said turret, gear operated lock means for said turret, hydraulic means including a first gear rack for actuating said clamp means and a second gear rack for actuating said lock means, a lost motion connection between said gear racks whereby said turret is locked before being clamped, a second hydraulic means having a disconnectable gear connection with said turret for indexing the latter in one rotational direction, and means operative by said clamp means for disconnecting said turret gear connection so as to prevent turret movement in the other rotational direction and permitting indexing only when said turret is unlocked and unclamped.

6. In combination in a machine tool, an indexable turret, first hydraulic means to successively unclamp and unlock said turret when moved in one direction and successively lock and clamp said turret when moved in another direction, a second hydraulic means having a disconnectable rack and gear connection with said turret to index the latter, and means operated by said first hydraulic means to disconnect said connection when said turret has been locked.

References Cited in the file of this patent

UNITED STATES PATENTS

| | | |
|---|---|---|
| 737,996 | Bullard | Sept. 1, 1903 |
| 1,868,016 | Marsilius et al. | July 19, 1932 |
| 2,400,691 | Grad | May 21, 1946 |
| 2,417,366 | Kylin et al. | Mar. 11, 1947 |
| 2,461,631 | Darash | Feb. 15, 1949 |
| 2,549,746 | Kylin et al. | Apr. 17, 1951 |
| 2,704,996 | Peterson et al. | Mar. 29, 1955 |
| 2,710,595 | Peterson et al. | June 14, 1955 |
| 2,832,235 | Denman | Apr. 29, 1958 |